Dec. 14, 1965 L. A. BETTCHER Re. 25,947

TRIMMING AND SLICING DEVICE

Original Filed June 24, 1960 2 Sheets-Sheet 1

INVENTOR.
LOUIS A. BETTCHER
BY Hudson, Boughton, Williams, David & Hoffman
ATTORNEYS

TRIMMING AND SLICING DEVICE

Original Filed June 24, 1960 2 Sheets-Sheet 2

INVENTOR.
LOUIS A. BETTCHER
BY Hudson, Boughton, Williams, David & Hoffmann
ATTORNEYS United States Patent Office Re. 25,947
Reissued Dec. 14, 1965

25,947

TRIMMING AND SLICING DEVICE

Louis A. Bettcher, Amherst, Ohio, assignor to Bettcher Industries, Inc., Vermilion, Ohio, a corporation of Ohio Original No. 3,024,532, dated Mar. 13, 1962, Ser. No. 38,556, June 24, 1960. Application for reissue Mar. 2, 1964, Ser. No. 358,678
14 Claims. (Cl. 30—276)

Matter enclosed in heavy brackets [ ] appears in the original patent but forms no part of this reissue specification; matter printed in italics indicates the additions made by reissue.

This invention relates to cutting devices and, as one of its objects, aims to provide a novel form of cutting device comprising an annular support means having an annular blade (of substantially frusto-conical shape) projecting therefrom and provided with a cutting edge on the small-diameter end thereof, and which device will operate effectively to cut a section or slice from a work body during relative translatory movement between the blade and a workholder means supporting the work body and, during which cutting operation, the severed section or slice passes through the opening of the support means and blade.

The present invention also provides a novel cutting device of the character just mentioned and in the form of a hand tool having handle means rigid with the annular support means and adapted to be grasped for manually drawing the device across the work body with the plane of the annular support means substantially parallel to the portion of the work body from which the section or slice is to be cut.

The invention further provides a novel cutting device of the kind above indicated wherein the blade is rotatable and the handle means had driving means therein for rotating the blade.

The invention likewise provides a novel cutting device of the construction referred to above wherein the *annular blade is* [taper] of [the] frusto-conical shape *converging* [of the annular blade extends along and around the inside of the blade and converges] toward an annular cutting edge on the innermost portion of the small-diameter end of the blade, so that a relative translatory movement between the blade and the work body substantially in or along the plane of the support means will result in an effective trimming or slicing action by the cutting edge.

Additionally this invention provides novel features of construction with respect to the form of the support means and the mounting of the blade thereon and by which advantageous results are achieved in the operation of the blade, as well as in the removability thereof for cleaning, sharpening, and the like.

Other objects, novel characteristics and advantages of this invention will be apparent in the following detailed description and in the accompanying drawings forming a part of this specification and in which, FIG. 1 is a top plan view of a cutting device embodying this invention;

Figure 1:
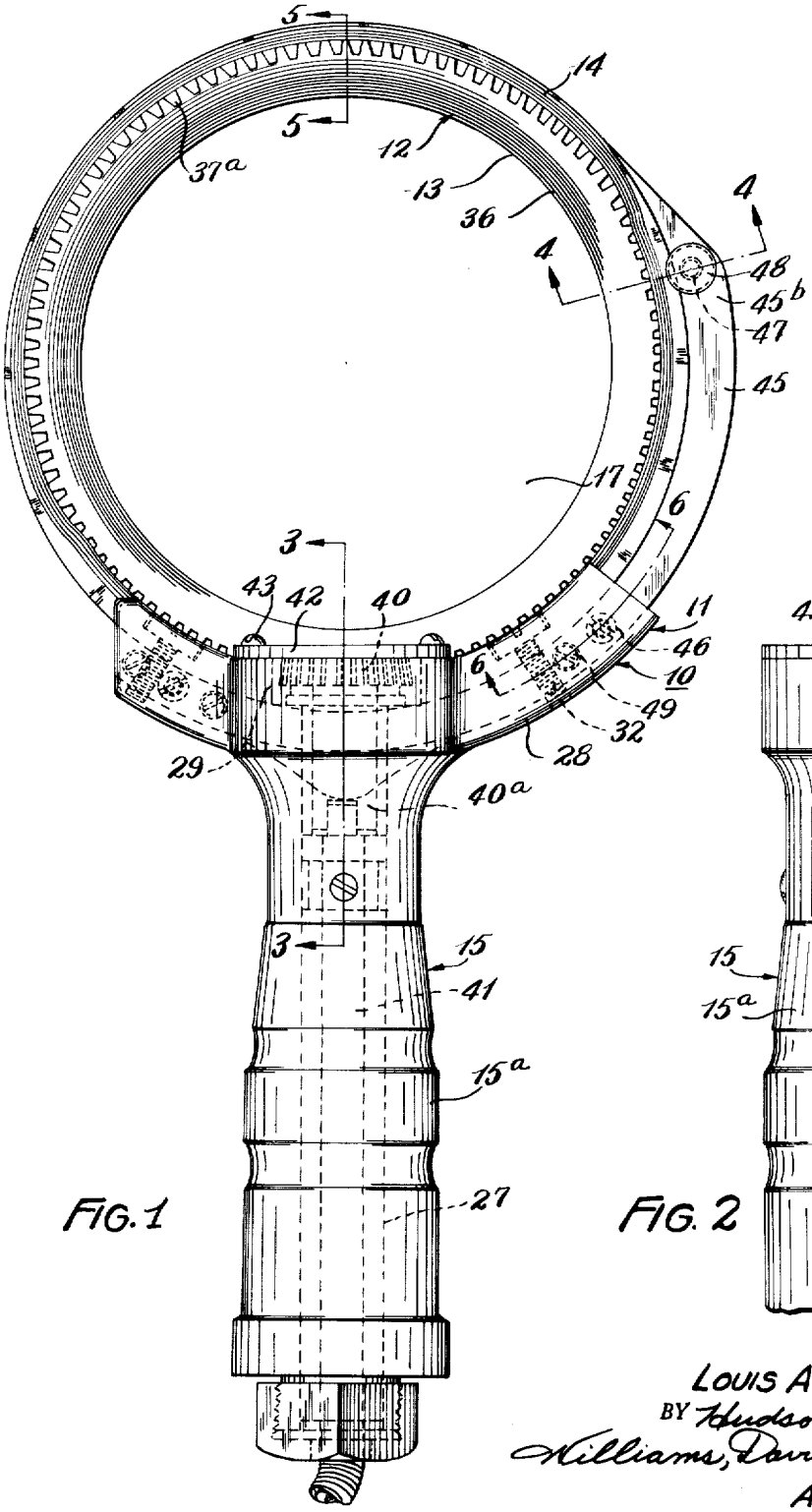
Figure 2:
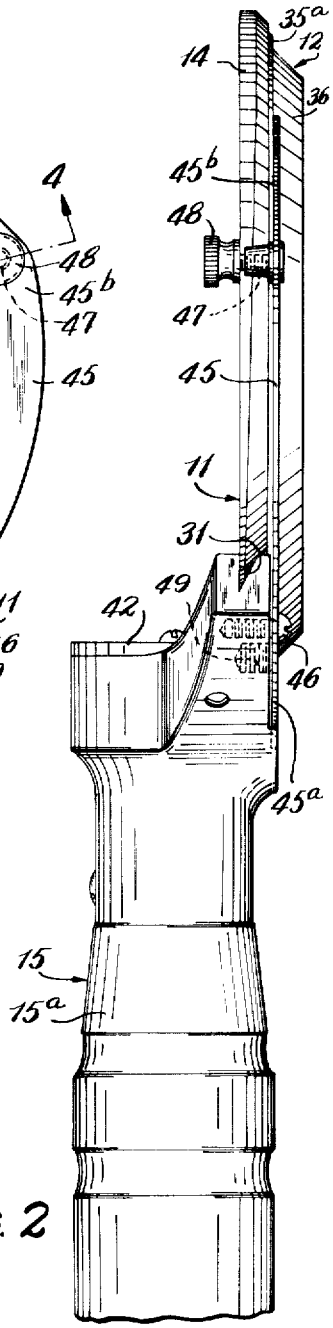
FIG. 2 is a side elevation thereof.
Figure 4:
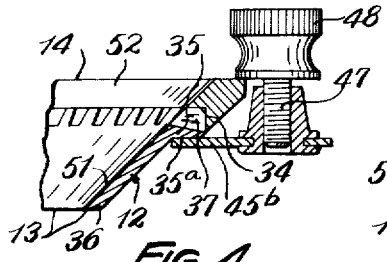
Figure 5:
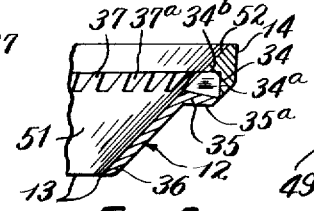
Figure 6:
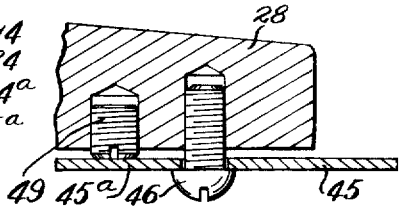
Figure 9:
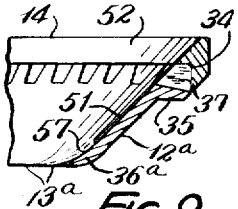
Figure 7:
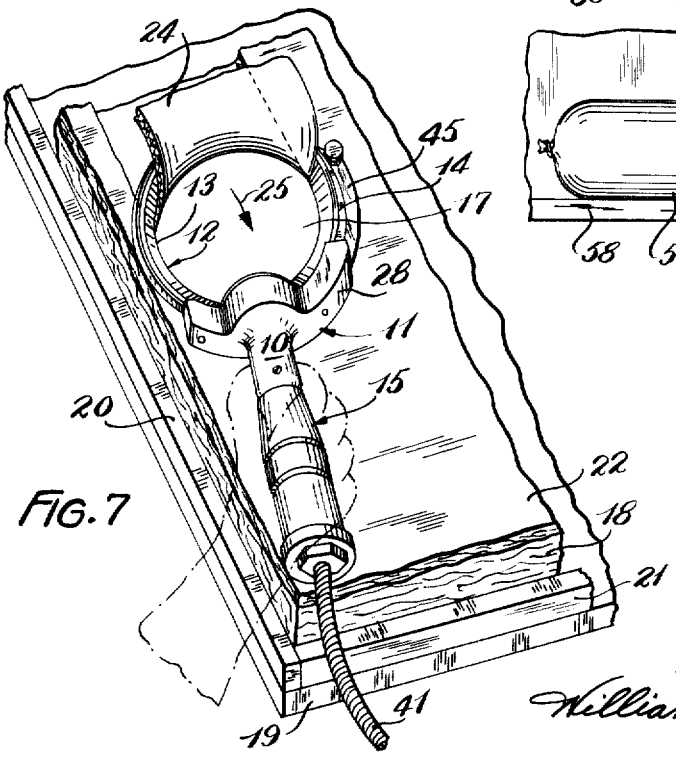
Figure 8:
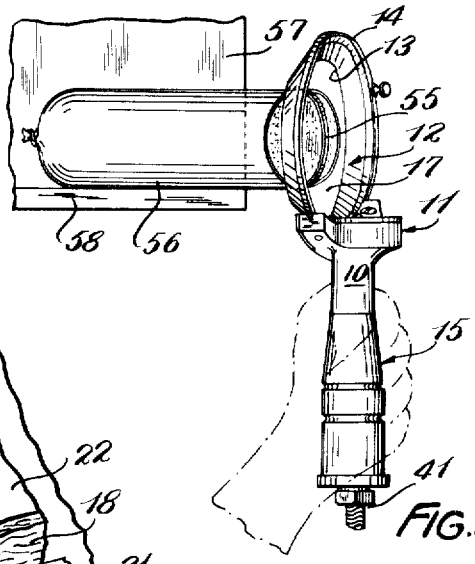

FIGS. 4 and 5 are transverse sectional views taken at different points around the annular support ring and blade, as indicated by section lines 4—4 and 5—5 of FIG. 1;

FIG. 6 is a fragmentary sectional view taken on section line 6—6 of FIG. 1 and showing adjustable stop means;

FIG. 7 is a perspective view showing the cutting device being used in a trimming operation;

FIG. 8 is another perspective view showing the cutting device being used in a slicing operation; and FIG. 9 is a sectional view similar to that of FIG. 5 but showing a modified construction.

As a highly practical embodiment of this invention the drawings show a cutting device 10 which comprises, in general, an annular support means 11 and a circular or ring-shaped blade 12 mounted thereon and having an annular cutting edge 13 on the inside thereof for application to a work body for cutting a section or slice therefrom during a translatory relative movement between the blade and the work body. The cutting device 10 can be used for carrying out such a cutting operation on various different kinds of work bodies but is especially suitable for cutting a section or slice from a slab or body of meat or a meat product, as will be further explained hereinafter.

The support means 11 is ring-shaped and comprises a ring member 14 on which the blade 12 is mounted in a coaxial relation thereto. The support means 11 is here shown as also comprising a handle 15 by which the device can be manually held and manipulated in the manner of a hand tool. The handle 15 extends substantially radially outward from the ring member 14 at one point of the circumfrence of the latter and lies substantially in or adjacent the flat plane of this ring member. The blade 12 and the ring member 14 have a common central opening 17 for the passage of the severed section or slice axially therethrough and themselves lie in a surrounding relation to, and wholly outside of, such common opening.

Before proceeding further with the detailed description of the cutting device 10, attention is called to FIG. 7 of the drawings as illustrating one manner of use of the device. This view shows a work support structure for a work body or meat slab 18, in this case a work table 19, having a flat top surface and side and end rails 20 and 21 rising thereabove and against which edge portions of the meat slab are engageable for locating and holding the same in the desired work position. The meat slab 18 may, for example, be a slab of brisket beef or the like from which a layer of fat 22 is to be trimmed for preparing the slab for further treatment such as a pickling treatment for converting the same into corned beef. The device 10 is also useful for trimming lean meat portions from a slab or layer of fat, as well as for various other cutting and trimming operations.

The cutting device 10 is shown in FIG. 7 as being used in the manner of a hand tool for carrying out such trimming operation during which a strip-like section 24 of the layer 22 is being cut from the work body 18 during relative translatory movement between the blade *12* [13] and the workholder table 19. During this trimming operation illustrated in FIG. 7 the device 10 is being drawn along the work body 18 in the general direction of the arrow 25 by movement manually applied to the handle 15 and by which the blade 12 is translated along the top of the work body substantially in the flat plane of the ring member 14, that is, in a plane substantially parallel to the portion of the work body from which the section 24 is being severed by the cutting edge 13. During the cutting operation thus performed the strip-like section 24 being trimmed from the work body 18 passes through the common opening 17 of the device. The section 24 thus cut or trimmed from the work body 18 can be of any desired thickness, depending upon the manner in which the cutting device 10 is manipulated and the amount of force applied thereto.

The handle 15 comprises a hollow stem portion 15[a] of a suitable size and shape to be conveniently grasped by the human hand and has a longitudinal passage 27 extending therethrough. The handle 15 also comprises a sector portion 28 at one end thereof and rigid therewith. The inner end of the handle 15, that is the end having the sector portion 28 thereon, contains a recess forming a gear chamber 29 with which the longitudinal passage 27 communicates. The handle 15 is disposed so that its axis lies in a plane which is perpendicular to the plane of the ring member 14 and contains the axis of the common opening 17.

The ring member 14 is secured along a portion of the circumference thereof to the sector portion 28 by being received in a groove 31 extending along the concave side of the latter and retained in such groove by suitable retaining screws 32. The screws 32 have the stems thereof threadedly engaged in the sector portion 28 while the heads of the screws partially overlie the groove 31 and engage the ring member 14 at spaced points for holding the latter firmly in its assembled position in the groove.

The ring member 14 is here shown as being a one-piece metal member lying substantially in a flat plane and having a transverse shape and size so that this member will be sufficiently strong to support the blade 13 but will be of minimum transverse dimension and axial thickness for reducing the size and weight of the support means 11, as well as to offer minimum obstruction to the passage of the severed material through the common opening 17. FIG. 5 of the drawings shows the relatively small-size cross-sectional shape of the ring member 14 along the side portion thereof substantially opposite the handle 15, and FIG. 4 shows the somewhat thicker cross-sectional form of this ring member along the side portion thereof adjacent the handle.

For an important purpose which will be presently explained, the ring member 14 has an annular groove 34 therein on the lower side thereof and which groove extends in a continuous relation along this ring member and around the common opening 17. The groove 34 is of a suitable cross-sectional shape, here shown as being an angular cross-sectional shape, defined by the corner recess formed between two annular walls 34$^a$ and 34$^b$ of the ring member 14 which extend therearound in an intersecting right-angular relation to each other.

The blade 12 comprises a one-piece circular or ring-shaped metal member of a frusto-conical shape and having an annular base portion 35 at the large-diameter end of the frusto-conical shape and an annular cutting edge 13 on the small-diameter end 36 thereof. The blade 12 is mounted on the ring member 14 by having the annular base portion 35 thereof slidably engaged in the groove 34 so as to provide for rotation of the blade on the support means 11 in the direction of its own circumference and around the common opening 17. The blade 12 and the ring member 14 are thus in a series or tandem relation along the axis of the opening 17.

The blade 12 is provided with gear teeth on the base portion 35 thereof and extending therearound to constitute a gear member or ring gear 37. The teeth of the gear 37 are preferably cut directly in the base portion 35 and lie on the side thereof facing the ring member 14 so that this gear will be housed, or partially housed, in the portion of the ring member containing the guide groove 34.

Figure 3:
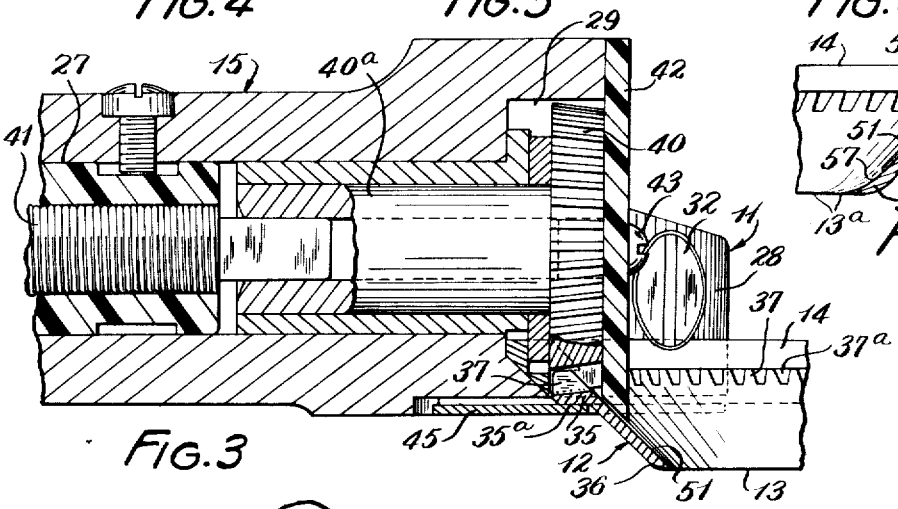
FIG. 3 is a partial longitudinal section on a larger scale and taken on section line 3—3 of FIG. 1.

As shown in FIGS. 1 and 3 of the drawings, the blade 12 is rotatably driven by the engagement of a driving gear or pinion 40 with the ring gear 37. The driving pinion 40 is located in the gear chamber 29 of the support means 11 and is connected with the drive means contained in the handle 15, in this case is connected to the end of a rotatable drive shaft 41 extending through the passage 27 of the handle. For the purpose of this connection with the shaft 41, the pinion 40 preferably has a stem portion 40$^a$ containing a noncircular socket into which a non-circular portion of the shaft 41 is engaged. The gear chamber 29 is closed by the provision of a suitable cover 42 extending thereacross and secured to a portion of the handle 15 by suitable connecting screws 43.

The support means 11 includes retaining means by which the blade 12 is retained in an assembled relation on the ring member 14 with the base portion 35 annularly slidable in the groove 34 as explained above. This retaining means comprises a sector member 45 which is here shown as being a plate-like member having a first portion 45$^a$ thereof secured to the sector portion 28 of the handle 15 by suitable clamping screws 46, and a second portion 45$^b$ projecting from the sector portion 28 and extending partway along the circumference of the ring member 14 on the lower side of the latter. The retaining member 45 is flexible in character so that the end portion 45$^b$ thereof will have a limited springing movement relative to the ring member 14 to permit the blade 12 to be removed from and reinserted into the groove 34.

For retaining engagement by the retaining member 45 the base portion 35 of the blade 12 is provided on the lower side thereof with an annular surface or shoulder 35$^a$. The shoulder 35$^a$ extends laterally of the blade 12 and annularly therearound on the outside thereof as shown in FIGS. 4 and 5, and, when the blade is assembled into the support ring 14, the retaining member 45 engages the shoulder 35$^a$ for retaining the base portion 35 in the groove 34. A screw 47 mounted on the springable portion 45$^b$ of the retaining member is engaged by a knurled nut 48 so that, by manual rotation of this nut, the springable portion can be drawn into holding engagement with the shoulder 35$^a$, or can be released therefrom to permit removal of the blade 12 from the ring member 14.

The rigidly secured portion 45$^a$ of the retaining member 45 also acts to retain the blade in the groove 34 by engagement with the shoulder 35$^a$ and, to prevent binding against the blade, stop means is provided on the sector portion 28 of the handle comprising a plurality of pairs of spaced stop screws 49. These stop screws are located adjacent to, or on opposite sides of, the clamping screws 46 as shown in FIG. 6 so that the exposed tops of the stop screws will be engaged by the retaining member 45 for locating the latter in a properly spaced relation to the sector portion 28 to retain the blade in its assembled position without preventing free rotation thereof in the groove 34.

Reverting now to the important matter of the shape of the blade 12, it is pointed out that the frusto-conical shape of this member provides a taper, or tapered surface 51, on the inside thereof which extends around and along the blade in a converging relation toward the cutting edge 13.

The angle of the taper 51 is such that the cutting edge 13 will constitute the innermost annular portion of the blade and will occupy a radially disposed, or radially inwardly presented, location or position on the small diameter end 36 of the blade. The location of the cutting edge 13 in this position will result in the cutting edge being exposed in an effective manner for engagement with the work body 18, but will still be in a shielded position against injurious personal contact therewith by reason of the fact that it is on the inside of the small-diameter end 36.

Upon relative translatory movement between the blade 12 and the work body 18, as by the cutting device 10 being drawn across the body with the ring member 14 moving in its own plane and substantially parallel to the surface portion of the work body from which the section is to be severed, the cutting edge will bite into the work body with an efficient cutting action in the nature of a slicing action. The cutting action of the edge 13 is particularly effective as a slicing type of cutting action because of the rotation imparted to the blade 12 during the translatory movement. Since the cutting edge 13 is presented substantially radially inwardly on the blade and is located at or adjacent the start of the taper 51, the severed material will pass readily through the common opening 17 as the relative translatory movement between the cutting device and work body progresses.

It will also be observed that since the cutting edge 13 is on the small-diameter end 36 of the blade 12, the taper 51 is divergent in character along the direction of movement of the severed material through the opening 17. Because of this diverging shape of the blade along the direction of movement of the severed material, the width of the opening 17 increases progressively therealong with the movement of the severed material and this assists the passage of the material through the opening. From the construction of the cutting device 10 as shown in the drawings and described above it will be recognized that the opening 17 is substantially greater in diameter than the combined axial length of the ring member 14 and the blade 12, and that this size relationship is further conducive to the free passage of severed material through the opening.

The blade 12 is substantially rigid in character and of a relatively short axial length in relation to the numerical value of the diameter across the opening 17 of the blade. The taper of the frusto-conical shape providing the taper 51 on the inside of the blade 12 is of such angular value that the cutting edge will be effective to accomplish the slicing type of cutting action explained above during the relative translatory movement between the blade and the work body resulting from the drawing of the ring member 14 across the work body in a substantially parallel relation to the surface portion thereof from which the section or slice is being cut. The taper angle most suitable for this action by the cutting edge 13 is a 45° included angle between the surface 51 and the axis of the common opening 17. Although such a 45° taper angle has been found to be highly effective and satisfactory in actual practice, the taper can be varied [somewhat] by the use of either a larger or smaller angular value.

With respect to the shape of the ring member 14, attention is called to the fact that this member is also frusto-conical in shape on the inside thereof so as to have a taper, or annularly tapered surface 52, extending therealong and around the opening 17 and which taper is substantially a continuation of the taper 51 of the blade 12 in the diverging direction of the latter taper. Since the taper 52 of the ring member 14 diverges in the direction of the movement of the severed material and provides a progressively increasing dimension for the width of the opening 17, the movement of the severed material through the ring member will be likewise facilitated.

The shape of the blade 12 on the outside thereof between the base portion 35 and the free end portion 36 can be of any desired form but is preferably of a frusto-conical shape similar to that providing the taper 51 on the inside of the blade, so that the portion of the blade projecting from the ring member 14 outward of the base portion 35 will be of a substantially uniform radial thickness at all circumferential points therearound. This uniform thickness for the blade 12 is advantageous in that it facilitates the construction of the blade, as well as the resharpening thereof by which the cutting edge 13 can be maintained in a sharp and effective condition even though the blade becomes somewhat shortened in its axial dimension by reason of successive sharpening operations performed thereon.

The gear 37 is so formed on the base portion 35 and the blade 12 is so disposed relative to the ring member 14 that the tooth spaces 37[a] will be left uncovered to a substantial extent on the upper side of the blade, as shown in FIG. 1. This uncovered condition for these spaces facilitates the escape of meat particles or cuttings therefrom during use of the device 10 and during cleaning of the device after use thereof.

FIG. 8 of the drawings shows the cutting device 10 being used in a slicing operation for cutting a relatively thin slice 55 from a work body comprising a meat product, such as a length of bologna 56, supported on a workholder table 57 and lying alongside of an edge rail 58 of the latter. During this slicing operation the work body 56 is held in a projecting relation to the workholder member 57 and a translatory movement of the cutting device 10 relative to the projecting portion of the work body causes the cutting edge 13 of the blade 12 to smoothly sever the slice 55 from such body. The severed slice 55 passes through the opening 17 in the manner already explained above in connection with the strip-like section 24 being trimmed from the work body 18.

FIG. 9 of the drawings shows a modified construction in which the annular blade 12[a] differs from the blade 12 described above in that the cutting edge 13[a] thereof comprises the innermost annular portion of a curved annular free-end portion 36[a] of the blade. When the blade 12[a] is of the shape shown in FIG. 9, the cutting edge 13[a] is in a radially inwardly presented position similar to that of the cutting edge 13 described above but is contiguous to an inner concave annular surface portion 57, instead of being immediately adjacent the frusto-conical taper 51 as in the case of the cutting edge 13.

From the accompanying drawings and the foregoing detailed description it will now be readily understood that this invention provides a cutting device of a highly practical and effective character which can be used for a desired trimming or slicing operation on meat bodies and various other materials. It will also be recognized that since the annular blade is rotatably driven during the cutting operation and the cutting edge is on the inside of the small-diameter end thereof, the blade will be highly effective but the cutting edge will still be in a relatively shielded location and not likely to cause personal injury by accidental contact therewith.

Although the cutting device of this invention has been illustrated and described herein to a somewhat detailed extent, it will be understood, of course, that the invention is not to be regarded as being limited correspondingly in scope but includes all changes and modifications coming within the terms of the claims thereof.

Having described my invention, I claim:

1. In apparatus comprising a rotatable cutter blade for cutting a relatively thin section from a work body on a workholder means by relative traversing movement between the blade and workholder means while the blade is in cutting engagement with said body; support means for said blade comprising ring means having an annular groove therein; means connected with said ring means and providing a gear chamber at one point of the circumference thereof; said blade comprising a one-piece ring member of frusto-conical shape on the inside thereof and having an annular base portion at the large-diameter end of the frusto-conical shape and provided with gear teeth, and an annular cutting edge at the small-diameter end of the frusto-conical shape; said base portion being circumferentially slidably movable in said groove; and rotatably driven gear means in said gear chamber and engaged with said gear teeth for rotating said blade; said ring means and said blade having a common central opening for passage of the severed section therethrough and being disposed so as to extend around and lie wholly outside of said opening; said blade being annularly continuous around said opening and disposed with the small-diameter end thereof projecting from said ring means as a free end and said cutting edge comprising the innermost annular portion of said free end; said frusto-conical shape providing a substantially continuous taper around the inside of and along said blade and extending in a converging relation toward said free end.

2. Apparatus as defined in claim 1 wherein said ring means and blade are in a series relation along the axis of said common opening; said ring means being frusto-conical in shape on the inside thereof for providing a taper thereon which is substantially a continuation of the taper of the blade in a direction along said axis and away from said cutting edge; the tapers on the inside of said blade and on the inside of said ring means being disposed so that said common opening increases progressively in size in the direction of the passage of the severed section therethrough.

3. Cutting apparatus as defined in claim 2 wherein said blade is also frusto-conical on the outside thereof so as to be relatively thin and have a substantially continuous convergent outer taper extending around and therealong toward said cutting edge.

4. Cutting apparatus as defined in claim 2 wherein the convergent axial taper on the inside of the blade is substantially a 45° taper.

5. In a cutting tool adapted to be manually held and manipulated for cutting a strip-like section or slice from a work body by drawing the tool thereacross; annular support means lying substantially in a flat plane and having hollow handle means rigid therewith and projecting substantially radially therefrom; an annular cutting blade mounted on said support means for rotation in the direction of its own circumference; driving means extending within said handle means and operably engaged with said blade for imparting rotation thereto; said support means and blade extending in a continuous relation around, and lying outside of, a common axial opening through which the severed section passes during the cutting thereof from said body; said blade having a free end portion of hollow frusto-conical tapered shape projecting from said support means in a convergent relation along the axis of said common opening and terminating in a radially inwardly presented annular cutting edge; said blade having the taper of said frusto-conical shape as a continuous convergent taper extending around the inside of and along said projecting end portion substantially to said cutting edge; said cutting edge being effective during the rotation of said blade and the manual drawing movement of said support means substantially in said plane across said body to sever said section therefrom; said handle means comprising a curved sector portion having a recess extending therealong on the concave side thereof, and said support means comprising a ring member having a segment thereof received in said recess; and holding means connected with said sector portion and engaging said segment to retain the latter in said recess for connecting said support means with said handle means.

6. A cutting tool comprising ring-shaped support means having an annular groove; handle means rigid with said support means and adapted to be manually grasped for holding and manipulating the tool; a rotatable annular blade of tapered frusto-conical shape having an annular base portion at the large diameter end thereof and provided with gear teeth, and an annular cutting edge at the small-diameter end thereof; said base portion being circumferentially slidably movable in said groove; and rotatable driving means supported by said handle means including a gear meshed with said gear teeth for imparting rotation to said blade; said support means and blade having a common central opening for passage of severed material therethrough and being substantially annularly coextensive so as to extend around and lie wholly outside of said common opening; said blade being disposed with said small-diameter end thereof projecting from said support means and having the taper of said frusto-conical shape as a continuous taper extending axially along and around the inside of said blade and converging toward said cutting edge; said common opening being substantially greater in diameter than the combined axial length of said support means and blade; said cutting edge comprising the intermost annular portion of said small-diameter end whereby said blade is effective to cut a section from a body of material in response to rotation of the blade and simultaneous translatory movement imparted thereto by manual movement of said support means substantially in its own plane and across said body in a substantially parallel relation to the portion of said body from which said section is being cut.

7. A cutting tool as defined in claim 6 wherein the axial taper on the inside of said blade is substantially a 45° taper.

8. A cutting tool as defined in claim 6 wherein said blade has an annular shoulder extending therearound on the outside thereof; and wherein retainer means at least partially coextensive with said ring means and connected therewith engages said shoulder for retaining said base portion in said groove.

9. A cutting tool as defined in claim 8 wherein said retainer means comprises a flexible sector member having a portion thereof springable away from said support means to permit disengagement and removal of said blade therefrom.

10. A cutting tool as defined in claim 6 wherein said annular base has tooth spaces extending thereacross between said gear teeth; said tooth spaces being in communication with said common opening to facilitate clearing movement of particles of said material out of said tooth spaces.

11. A cutting tool comprising ring-shaped support means having an annular groove; handle means rigid with said support means and adapted to be manually grasped for holding and manipulating the tool; a rotatable annular blade of tapered frusto-conical shape having an annular base portion at the large-diameter end thereof and provided with gear teeth, and an annular cutting edge at the small-diameter end thereof; said base portion being circumferentially slidably movable in said groove; rotatable driving means supported by said handle means including a gear meshed with said gear teeth for imparting rotation to said blade; said support means and blade having a common central opening for passage of severed material therethrough and being substantially annularly coextensive so as to extend around and lie wholly outside of said common opening; said blade being disposed with said small-diameter end thereof projecting from said support means and having the taper of said frusto-conical shape as a continuous convergent taper extending axially along and around the inside of said blade and terminating at said cutting edge; said cutting edge being on the innermost annular portion of said small-diameter end whereby said blade is effective to cut a section from a body of material in response to rotation of the blade and simultaneous translatory movement imparted thereto by manual movement of said support means substantially in its own plane and across said body in a substantially parallel relation to the portion of said body from which said section is being cut; said blade having an annular shoulder extending therearound on the outside thereof; and retaining means comprising a sector member at least partially coextensive with said support means and engaging said shoulder for retaining said base portion in said groove; said member having a first portion secured on said support means and a flexible second portion springable away from said support means to permit disengagement and removal of said blade therefrom.

12. A cutting tool as defined in claim 11 wherein said support means has adjustable stop means thereon engageable by said first portion of said sector member for preventing binding thereof against said blade.

13. A cutting tool as defined in claim 11 wherein the portion of said small-diameter end immediately adjacent said cutting edge is annularly concave therearound on the inside thereof.

*14. A cutting tool for cutting slices from a meat product by drawing the tool thereacross comprising a ring-shaped support means having an annular groove; handle means extending substantially radially therefrom and rigid with said support means and adapted to be manually grasped for holding and manipulating the tool; a rotatable annular blade having an annular base portion at one end thereof provided with gear teeth, and an inwardly facing annular cutting edge at the other end thereof and lying in a plane parallel to and appreciably spaced from the plane of the adjacent face of said ring-shape support means, the*

*diameter of said cutting edge being substantially less than the inside diameter of said base portion of said blade, the annular portion immediately adjacent to said cutting edge sloping radially outwardly and towards said annular base portion; said base portion being circumferentially slidably movable in said groove; and rotatable driving means supported by said handle means including a gear meshed with said gear teeth for imparting rotation to said blade; said support means and blade having a common central opening for passage of severed slices therethrough and being substantially annularly coextensive so as to extend around and lie wholly outside of said common opening; said blade being disposed with the cutting end thereof projecting from said support means and said common opening being substantially greater in diameter than the combined axial length of said support means and blade; said cutting edge comprising the innermost annular portion of said other end of said blade whereby said blade is effective to cut a slice from a meat product in response to rotation of the blade and simultaneous translatory movement thereof imparted thereto by manual movement of said support means substantially in its own plane and across said meat product in a substantially parallel relation to the portion of said meat product from which said slice is being cut.*

References Cited by the Examiner

The following references, cited by the Examiner, are of record in the patented file of this patent or the original patent.

UNITED STATES PATENTS

| | | | |
|---|---|---|---|
| 1,741,797 | 12/1929 | Stevens | 30—276 |
| 1,804,977 | 5/1931 | Gallison et al. | 30—276 X |
| 1,973,631 | 9/1934 | Johnson | 30—29.5 |
| 2,191,073 | 2/1940 | Fishbein et al. | 30—29.5 |
| 2,359,584 | 10/1944 | Roehner | 30—49 X |
| 2,556,208 | 6/1951 | Musso | 30—42 |
| 2,598,711 | 6/1952 | Musso | 30—49 |
| 2,632,242 | 3/1953 | Musso | 30—41 |
| 2,827,657 | 3/1958 | Bettcher | 71—1.5 |

FOREIGN PATENTS

| | | |
|---|---|---|
| 1,064,216 | 8/1959 | Germany. |

WILLIAM FELDMAN, *Primary Examiner.*

EDWARD V. BENHAM, MILTON S. MEHR, *Examiners.*

J. C. PETERS, *Assistant Examiner.*